(12) United States Patent
Hellot (10) Patent No.: US 11,433,847 B2
(45) Date of Patent: Sep. 6, 2022

(54) AIRBAG MODULE WITH A CONTROLLABLE VENTILATION DEVICE

(71) Applicant: Autoliv Development AB, Vargarda (SE)

(72) Inventor: Laurent Hellot, La Feuillie (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/258,874

(22) PCT Filed: Jul. 4, 2019

(86) PCT No.: PCT/EP2019/067951
§ 371 (c)(1),
(2) Date: Jan. 8, 2021

(87) PCT Pub. No.: WO2020/011634
PCT Pub. Date: Jan. 16, 2020

(65) Prior Publication Data
US 2021/0323495 A1     Oct. 21, 2021

(30) Foreign Application Priority Data
Jul. 12, 2018 (DE) .......................... 102018116859.4

(51) Int. Cl.
*B60R 21/2338*    (2011.01)
*B60R 21/239*    (2006.01)

(52) U.S. Cl.
CPC ........ *B60R 21/2338* (2013.01); *B60R 21/239* (2013.01); *B60R 2021/2395* (2013.01); *B60R 2021/23384* (2013.01)

(58) Field of Classification Search
CPC ............. B60R 21/2338; B60R 21/239; B60R 2021/23384; B60R 2021/2395
See application file for complete search history.

(56) References Cited

U.S. PATENT DOCUMENTS

| 6,773,030 | B2 * | 8/2004 | Fischer | ................. B60R 21/233 |
| | | | | 280/739 |
| 7,475,906 | B2 * | 1/2009 | Goto | ................... B60R 21/2338 |
| | | | | 280/738 |

(Continued)

FOREIGN PATENT DOCUMENTS

CN      101306672 A   * 11/2008 ......... B60R 21/2338

*Primary Examiner* — Drew J Brown
(74) *Attorney, Agent, or Firm* — Foley & Lardner LLP (57) ABSTRACT

The airbag comprises an outer skin (20) having a first opening (26), a flap (32) being at least indirectly attached to the outer skin (20), and a tether (37). The first end of the tether is attached to a flap (32) and the second end (37b) of the tether is detachably attached to a holding element (16). When the airbag is deployed and the tether (37) is under tension, the flap (32) covers the first opening (26) at least partially such that the ventilation device is in a closed or throttled first state. When the airbag is deployed and the tether (37) is not under tension because the second end (37b) of the tether is detached from the holding element, the flap (32) covers the first opening (26) less than in in the first state, such that the ventilation device is in second state. The flap (32) is located between the outer skin (20) and an additional layer (34) having a second opening (36) at least partially overlapping the first opening (26).

17 Claims, 7 Drawing Sheets

(56) References Cited

U.S. PATENT DOCUMENTS

| | | | |
|---|---|---|---|
| 7,600,782 B2* | 10/2009 | Ishiguro | B60R 21/239 |
| | | | 280/739 |
| 8,746,736 B2* | 6/2014 | Mendez | B60R 21/239 |
| | | | 280/736 |
| 11,130,468 B2* | 9/2021 | Baba | B60R 21/2338 |
| 2012/0074677 A1 | 3/2012 | Hiruta et al. | |
| 2012/0306187 A1 | 12/2012 | Mendez et al. | |
| 2013/0038046 A1 | 2/2013 | Inuzuka et al. | |
| 2017/0349134 A1* | 12/2017 | Kwon | B60R 21/2338 |

* cited by examiner

AIRBAG MODULE WITH A CONTROLLABLE VENTILATION DEVICE

The invention relates to an airbag module having a ventilation device according to the preamble of claim 1.

Airbag modules comprising an airbag and an inflator are widely used in today's automotive technology. Several types of airbag modules are known, especially frontal airbag modules, side airbag modules and curtain airbag modules. Often, the airbag of an airbag module comprises at least one ventilation device such that gas can exit the gas space through that ventilation device when it is in an open state. The simplest form of such a ventilation device is a hole in the outer skin of the airbag. Frontal airbags for protecting the head and the torso of the driver or the head and the torso of the passenger sitting next to the driver always comprise a ventilation device.

It is well known in the prior art to provide the ventilation device with a flap being attached to the outer skin such that in a first state this flap covers the hole—also referred to as "first opening" in this application—such that in this state the gas flow through this first opening is blocked or at least throttled. It is further known to control this flap and thus the ventilation by means of a tether whose first end is attached to this flap. The second end of this tether is connected to a holding element in a detachable manner. The length of the tether is chosen such that the tether is under tension when the airbag is fully deployed and the tether is attached to the holding element. In this state the flap is held by the tether and covers the first opening. If the tether is detached from the holding element it loses its tension and cannot hold the flap any longer such that it is pushed through the first opening because of the over pressure inside the airbag and so gas is ventilated out of the airbag through the first opening. A generic airbag is for example known from U.S. Pat. No. 6,648,371 B2.

Starting from this prior art this invention sets itself the task to improve a generic airbag module in such a way that it is easy and thus cost effective to manufacture and still the ventilation device works in a reliable and reproducible manner. It is a further desired that the ventilation device works properly even if the first opening has a relatively large cross section.

This task is solved by an airbag module having the features of claim 1.

According to the invention an additional layer having a second opening at least partially overlapping the first opening is provided and the flap is located between the outer skin and the additional layer such that a three-layered sandwich is formed with the flap being the middle layer. A connection section of the flap is directly or indirectly (via the additional layer) attached to the outer skin and a tether is attached to the flap remote from the connection section. So, the flap is positioned and stabilized during the folding process, the storage and the deployment of the airbag. As long as the tether is under tension, the flap remains between the outer skin of the airbag and the additional layer even when the airbag is filled with gas having a higher pressure than the air of the environment, but as soon as the tether loses its tension, the flap is pushed through the outer of the two openings. This leads to both: a tight sealing and a reproducible behaviour. Additionally, the inventive ventilation device is very easy to manufacture.

Often it will be preferred to locate the flap and the additional layer on the outer surface of the outer skin of the airbag. This can have advantages in the production process and additionally it gives an easy possibility to tune the ventilation behaviour without the necessity to alter the outer skin with its first opening. Further, in some cases it might be advantageous to use a material for the additional layer that is stiffer than the material of the outer skin of the airbag.

In order to achieve a very tight sealing, it can be preferred that the additional layer overlaps the flap only partially such that at least a part of the connection section of the flap is not covered by the additional layer. By this measure no or only a small pulling force is applied from the flap to the additional layer. This leads to improved gas tightness.

In order to simplify the sewing process it is often preferred to apply only one seam connecting both, the flap and the additional layer to the outer skin. In order to ensure that the tether is not sewn to the outer skin, it is further preferred that this seam is not closed.

Because large ventilation holes can be controlled, the invention is especially useful for large airbags with a volume of more than 75 litres.

Further preferred embodiments are defined in the further sub-claims.

The invention will now be described by means of preferred embodiments in view of the figures. The figures show:

FIG. 1 all components of a first embodiment of the inventive airbag in a not yet assembled state, FIG. 2 the detail D1 of FIG. 1 in an enlarged representation, FIG. 3 the additional cutting of FIG. 1 also in an enlarged representation and the tether element of FIG. 1 being attached to this additional cutting, FIG. 4 the additional cutting of FIG. 2 after a folding step, FIG. 5 the additional cutting of FIG. 4 being placed onto the section of the outer skin shown in FIG. 3 after the application of a peripheral seam, FIG. 6 a cutting along plane A-A in FIG. 5 in a schematic representation, FIG. 7 a complete airbag module with its airbag being completely deployed, FIG. 8 the detail D2 of FIG. 7, FIG. 9 what is shown in FIG. 7 after a detachable part has been detached from a holding element, FIG. 10 The detail D3 of FIG. 9, FIG. 11 a variation of the first embodiment in a view according to FIG. 5, FIG. 12 a second embodiment of the controllable ventilation device, and FIG. 13 a variation of the second embodiment.

Figure 1:
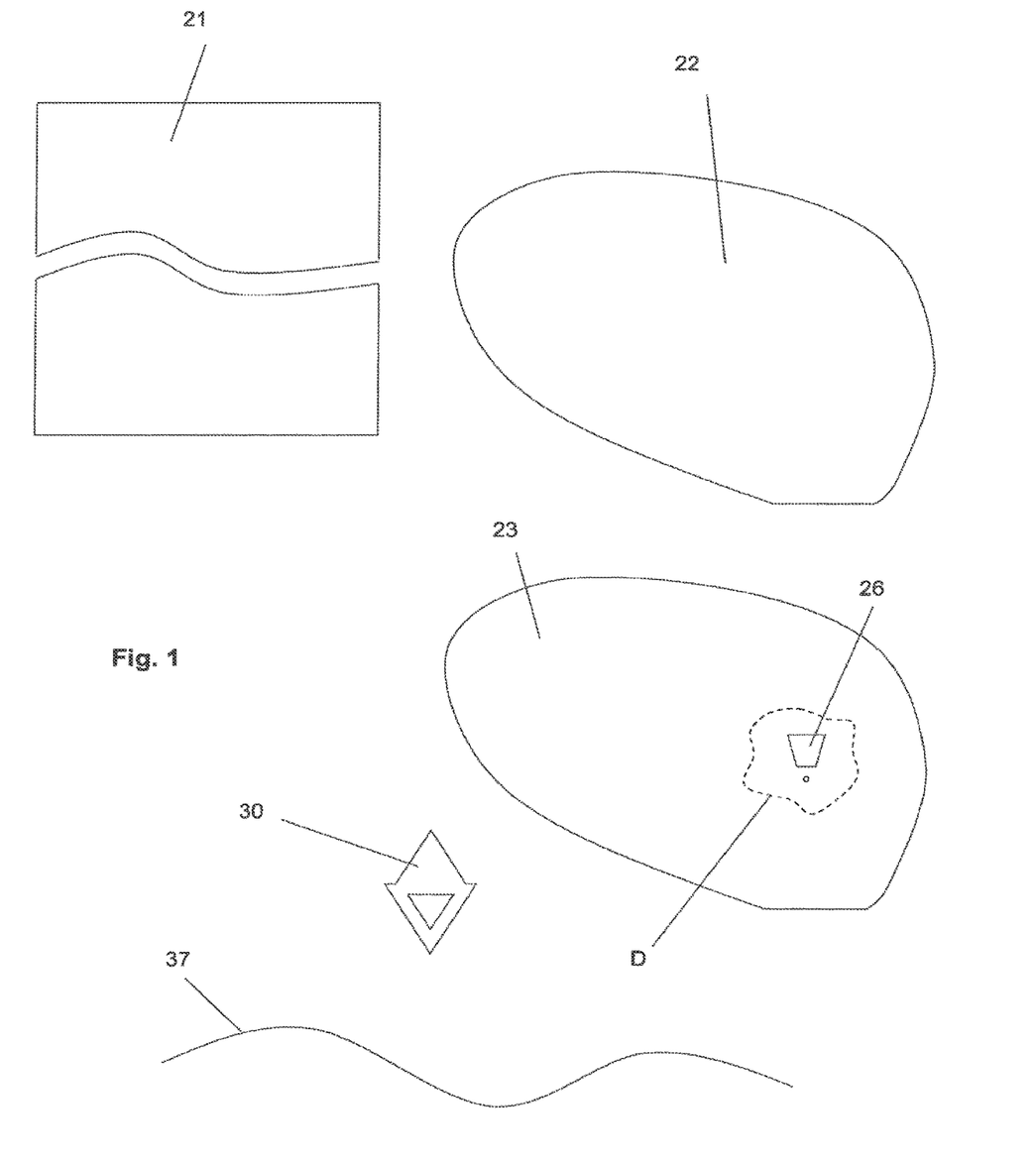

FIG. 1 shows all components of an embodiment of an airbag of the inventive airbag module. As every airbag, his airbag comprises an outer skin. In the embodiment shown this outer skin is made from three cuttings, namely the cutting for a middle part 21 and two cuttings 22, 23 for side parts. It needs to be mentioned at this point that this invention is not limited to airbags having an outer skin being made from three cuttings. Of course this invention can also be applied to airbags whose outer skins are made from fewer cuttings (one cutting or two cuttings) or more than three cuttings. One of these cuttings (here the cutting 23 for a side part) comprises a first opening 26 and an opening 28 for a tether. It is preferred that this first opening 26 and the opening 28 for the tether are distinct openings, but it would also be possible that they are parts of a joint opening. In the embodiment shown, the first opening 26 is trapezoid-shaped, but this is of course also not mandatory. The first opening 26 can basically have any shape.

Additionally to the cuttings 21 to 23 for the outer skin an additional cutting 30 is provided. This additional cutting 30 is comprised of a flap section 32 for forming a flap 32 and an additional section 34 for forming an additional layer 34. In the embodiment shown these two sections 32, 34 are triangular shaped with the flap section 32 being smaller than the additional section 34. This is a preferred shape but of course other shapes are also possible. But generally the flap 32 is smaller than the additional layer 34. In the additional section 34 (and thus in the additional layer 34) a second opening 36 is provided. In this embodiment (and this is preferred) this second opening 36 is completely surrounded by the additional section/layer 34 meaning that the second opening 36 is a hole being completely encircled by a closed edge. But in contrast to the first opening 26 which is always a hole (being completely surrounded by a closed edge) the second opening 36 needs not necessarily be surrounded by such a closed edge. The second opening 36 is smaller than the flap 32.

Finally, a tether 37 is provided.

Figure 2:
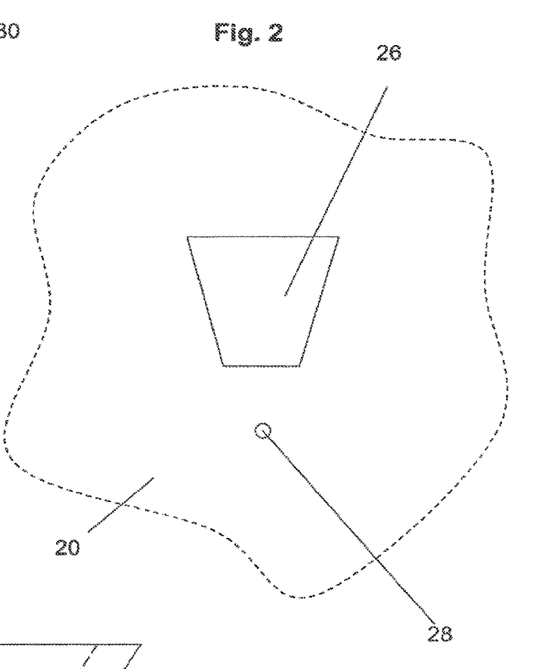
Figure 3:
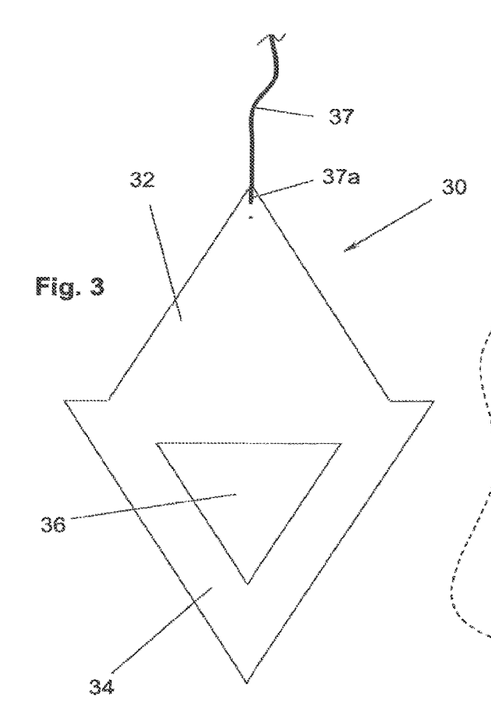

In a first step as shown in FIG. 2, a first end 37a of the tether 37 is attached, especially sewn, to the flap section 32 at the end of the flap section 32 remote from the additional section 34. Of course it would also be possible to make the flap section 32 and the tether 37 in one piece but this is usually not preferred.

Figure 4:
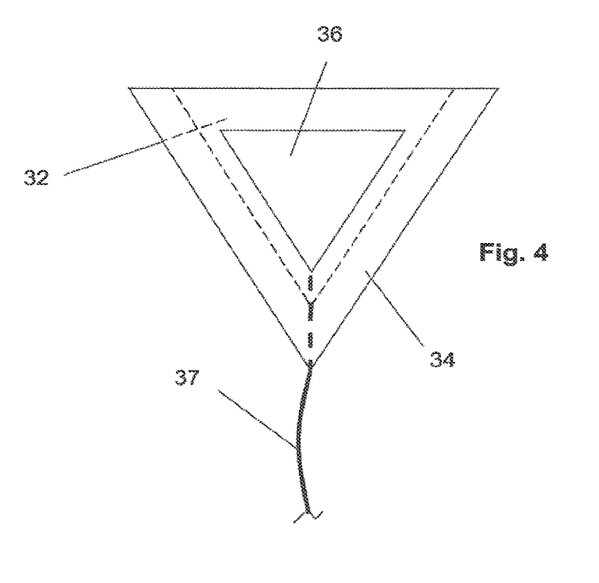
Figure 5:
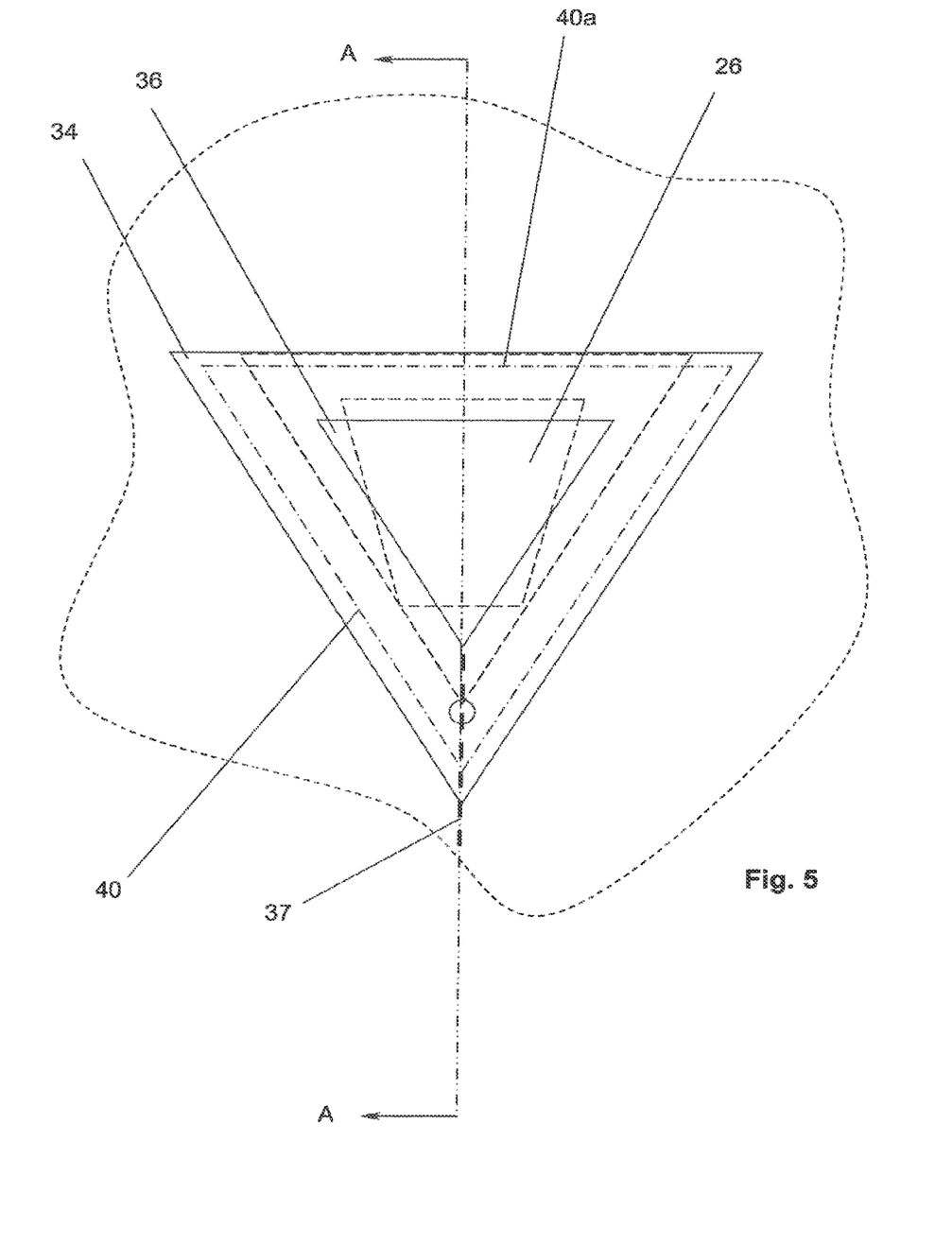
Figure 6:
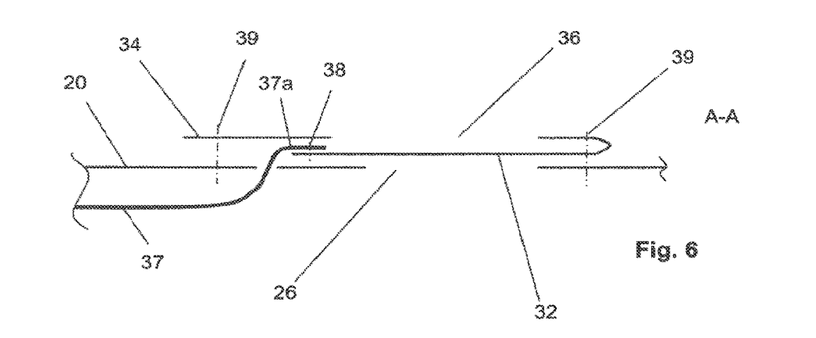

In a next step as shown in FIG. 4 the flap section 32 is bent under the additional section 34 such that it covers the second opening 36. In this state, the tether is run through the opening 28. Then the additional cutting 30 is placed onto the outer skin 20 such that the first opening 26 is covered by the additional cutting 30. Now the additional layer 34 is sewn to the outer skin by means of a closed peripheral seam 39. The section 39a of this peripheral seam 39 connects a connection section of the flap 32 directly to the additional layer and to the outer skin 20. Because the flap 32 covers the second opening 36 completely, a gas flow through this second opening 36 is blocked in this state, and since the peripheral seam 39 connects the additional layer 34 tightly to the outer skin 20, no gas can stream out of the gas space enclosed by the outer skin 20.

Forming the additional layer 34 and the flap 32 from a joint cutting simplifies the production but is not functionally mandatory.

Figure 7:
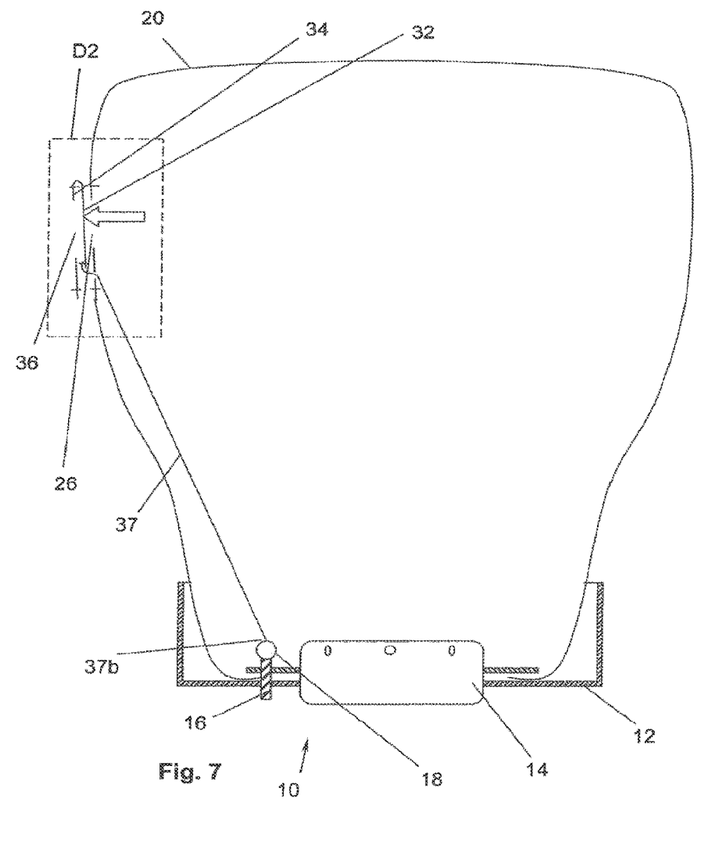

FIG. 7 shows the complete airbag module 10 being comprised of the outer skin 20, the additional layer 34, the flap 32, the tether 37, a housing 12, an inflator 14, and a holding element 16 holding a detachable part 18. The second end 37b of the tether 37 is attached to the attachable part 18 and thus to the holding element. In the case that the holding element 16 is for example in a form of a micro bag as described in DE 10 2014 000 185 A1 this second end 37a of the tether 37 could directly be attached to this holding element.

Figure 8:
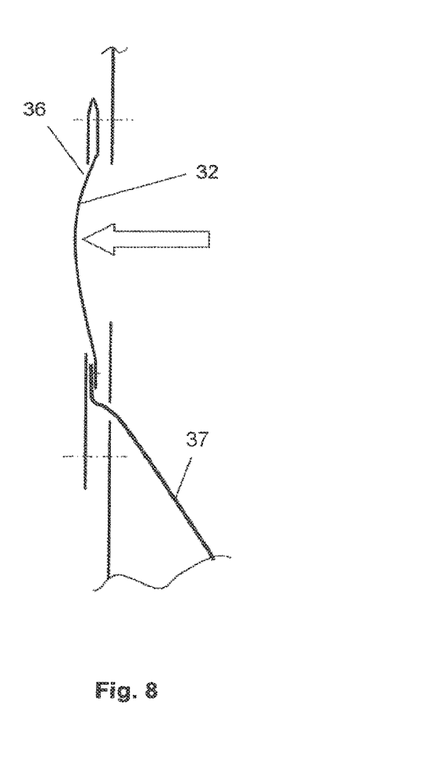
Figures 9, 10:
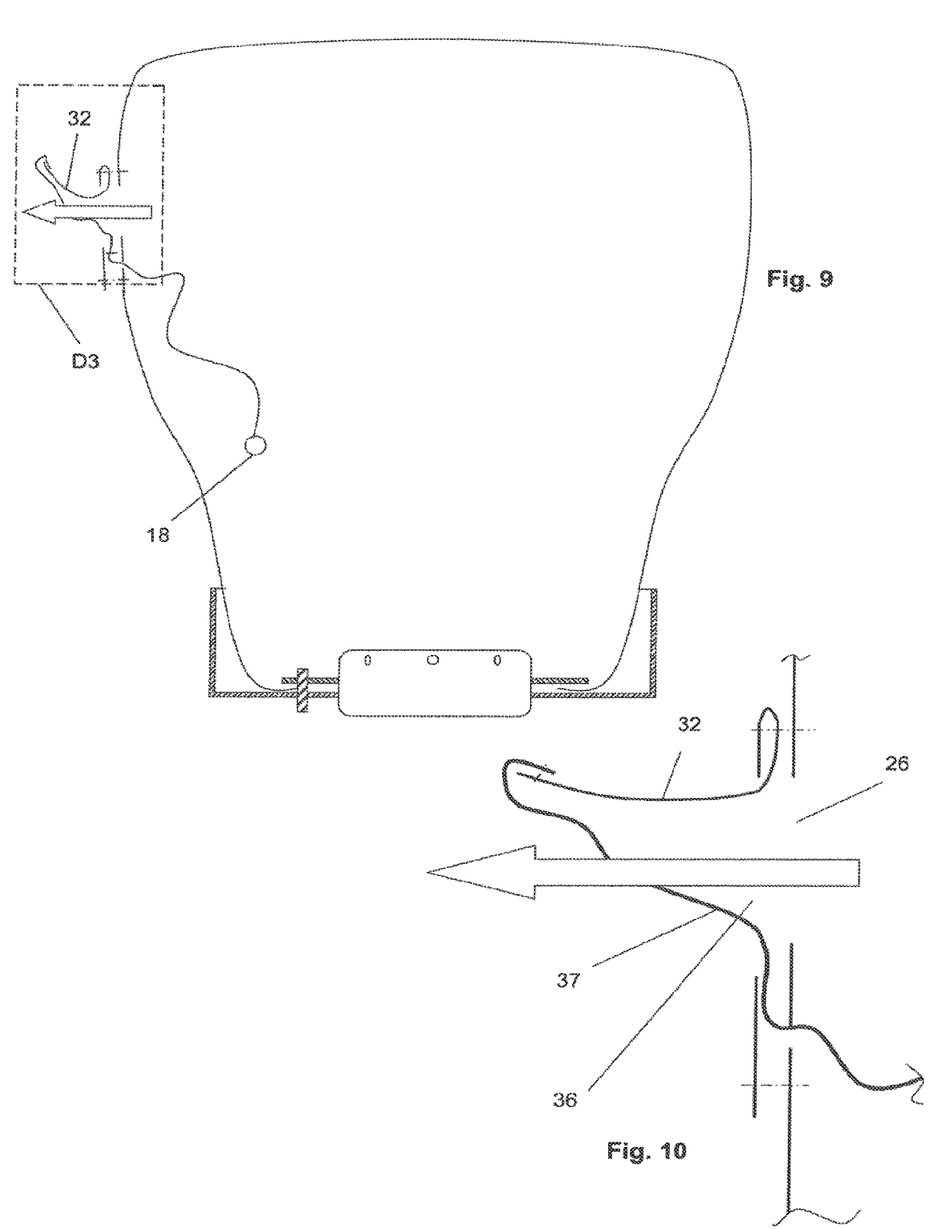

In FIG. 7 the state in which the outer skin 20 of the airbag is completely deployed and the tether 37 is attached to the holding element 16 is shown. The length of the tether 37 is chosen such that it is under tension in this state and thus holds the flap 32 even though the gas pressure pushes it towards the outside (FIG. 8). The "sandwich design" leads to a defined position of the flap in which it abuts the outer layer formed by the additional layer. This causes a relatively strong friction between the flap and the outer layer leading to a tight sealing. After triggering the holding element 16 (usually by means of an electric signal) the second end 37b of tether 37 is detached from the holding element 16 and thus loses its tension. So it cannot hold the flap 32 any longer and the flap 32 is pushed through the second opening 36 by the gas in the gas space having a higher pressure than the air in the environment. (see FIGS. 9 and 10). So the passageway through the first opening 26 and the second opening 36 is open and gas can stream out of the gas space.

Figure 11:
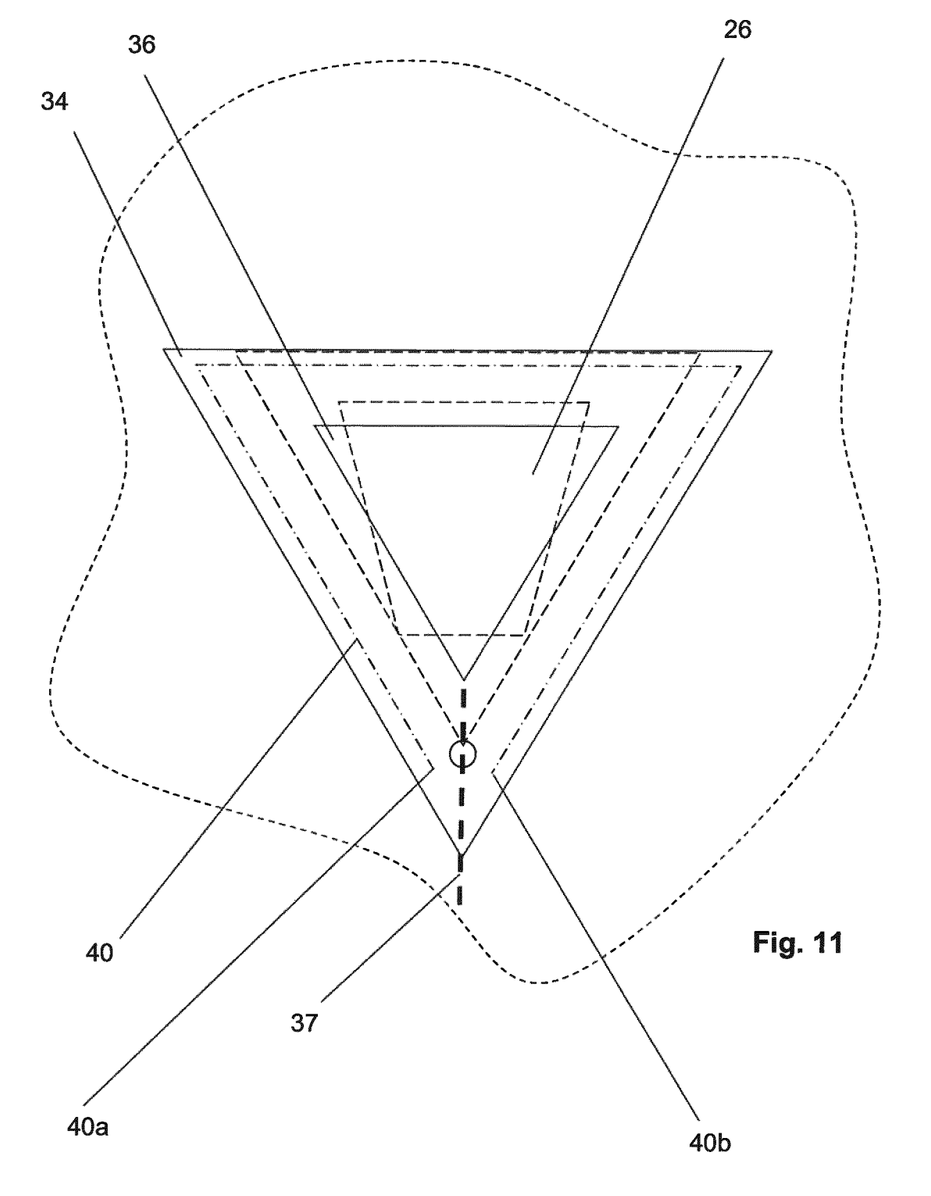

FIG. 11 shows a variation to the embodiment of the controllable ventilation device just described. Here, the peripheral seam 40 which forms the connection between the flap 32 and the outer skin and the additional layer 34 and the outer skin is open near the opening 28 for the tether (and thus near a vertex of the triangle-shaped additional layer 34). In other words: The peripheral seam 40 has two ends 45a, 45b. This has the advantage that the sewing process is simplified since no additional measures must be taken in order to avoid that the tether 37 is sewn to the outer skin.

Figure 12:
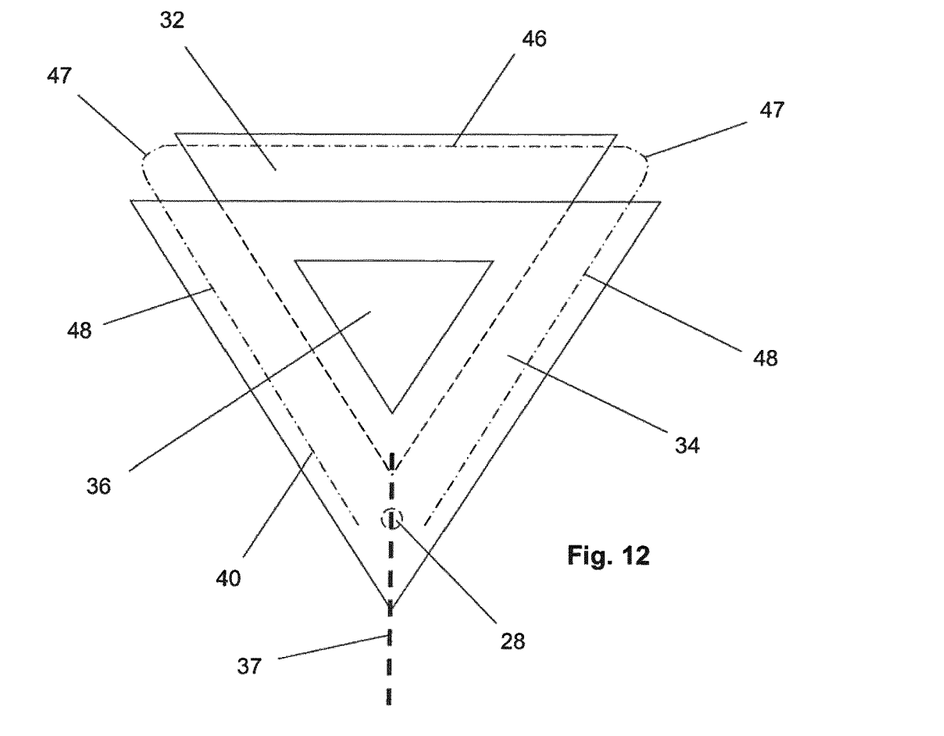

FIG. 12 shows a second embodiment of the controllable vent in a representation according to FIG. 11, but with the first opening in the outer skin not being shown. As in the first embodiment, the additional layer 34 and the flap 32 are both triangle-shaped with the additional layer 34 having the larger surface. In contrast to the first embodiment, the additional layer 34 does not cover the flap 32 completely. So, the additional layer 34 has a section that does not cover the flap 32 (as in the first embodiment) and the flap 32 has a section that is not covered by the additional layer 34. This makes it possible to arrange the connection (namely the peripheral seam 40) such that it has one section 46 which exclusively connects the flap 32 to the outer skin 20 and two sections 48 which exclusively connect the additional layer 34 to the outer skin. Intermediate sections 47 are located between those sections. The advantage of this geometry is that the pulling forces that are applied to the flap 32 by the tether 37 when the ventilation device is in its closed state are not transferred to the additional layer 34 because there is no direct connection between the flap 32 and the additional layer 34. Tests have shown that this leads to improved gas tightness.

Figure 13:
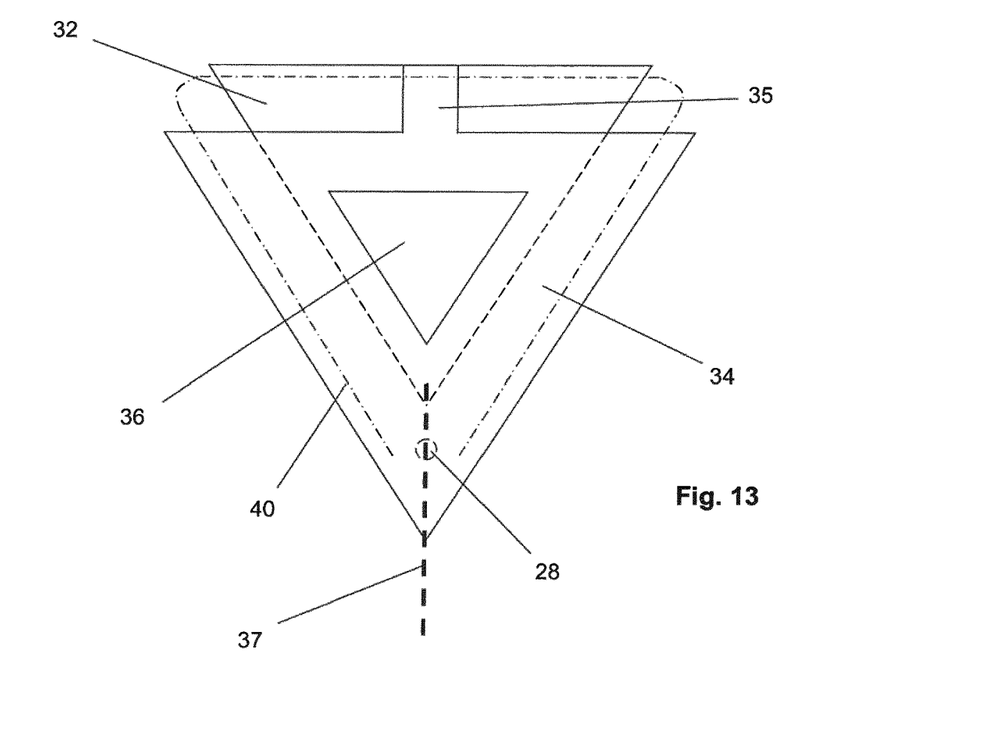

In the embodiment of FIG. 12 the flap 32 and the additional layer 34 are separate cuttings. This can often be preferred, since this leads easily to the desired de-coupling between the flap 32 and the additional layer 34. But, as can for example be seen from FIG. 13, the flap and the additional layer can also be parts of a single cutting. In this case a narrow connecting strip 35 can connect the two parts. In order to eliminate any pull force transmission from the flap 32 to the additional layer 34, this connecting strip 35 could have a slack after the seam 40 has been applied.

According to the current knowledge, attaching the additional layer 34 and the flap 32 to the outer surface of the outer skin 20 of the airbag is often preferred, but in principal it would also be possible to attach the elements to the inner surface. In this case it can be preferred to provide the additional layer 34 with a hole for the tether.

Since the pressure inside the outer skin can be controlled by means of the active ventilation device, the inflator can be single-stage inflator in many cases.

LIST OF REFERENCE NUMBERS

10 Airbag module
12 housing
14 Inflator
16 holding element
18 detachable part
20 outer skin
21 cutting for middle part
22, 23 cutting for side part
26 first opening
28 opening for tether
30 additional cutting 32 flap section/flap
34 additional section/additional layer
35 connecting strip
36 second opening
37 tether
37a first end
37b second end
38 seam of tether
40 peripheral seam
40a, 40b ends of peripheral seam
41 section of peripheral seam
45 connecting seam
45a, 45b ends of peripheral seam
46 section connecting the flap
47 intermediate section
48 section connecting the additional layer

The invention claimed is:

1. An airbag module comprising:
an inflator; and
an airbag including:
  an outer skin, the outer skin having a first opening,
  a controllable ventilation device having a flap at least indirectly attached to the outer skin, the controllable ventilation device further having an additional layer,
  a tether having a first end attached to the flap,
wherein when the airbag is deployed and the tether is under tension, the flap covers the first opening at least partially such that the ventilation device is in a closed or throttled first state, and wherein when the airbag is deployed and the tether is not under tension, the flap covers the first opening less than in in the first state, such that the ventilation device is in second state, the additional layer having a second opening overlapping the flap, and wherein the additional layer covers the periphery of the flap such that the flap is held between the outer skin and the additional layer when in the first state, and
wherein the flap and the additional layer are a part of a single additional cutting.

2. The airbag module according to one of the claim 1, wherein the additional layer is coupled to the outer skin.

3. The airbag module according to claim 2, wherein a portion of the flap is connected to the outer skin and the additional layer.

4. The airbag module according to claim 3, wherein the portion of the flap connected to the outer skin and the additional layer is sandwiched between the outer skin and the additional layer.

5. The airbag module according to claim 2, wherein one edge of the flap is the portion connected to the outer skin and the additional layer.

6. The airbag module according to one of the claim 1, wherein the flap and the additional layer are separate cuttings.

7. The airbag module according to claim 1, wherein the additional layer overlaps the flap only partially such that the additional layer has a section that does not cover the flap and that the flap has a section that is not covered by the additional layer.

8. The airbag module according to claim 1, wherein the tether extends through an opening for the tether in one of the outer skin or the additional layer.

9. The airbag module according to claim 8, characterized in that the opening for the tether is located between a vertex of the flap and the vertex of the additional layer.

10. The airbag module according to claim 8, wherein the tether is not closed in the region of the opening.

11. The airbag module according to claim 1, wherein the flap covers at least the outer of the two openings completely when the airbag is in its second state.

12. The airbag module according to claim 1, wherein the inflator is a single stage inflator.

13. The airbag module according to claim 1, wherein the tether has a second end that is attached to a holding element, and
wherein the holding element is configured to selectively release the second end of the tether.

14. An airbag module comprising:
an inflator; and
an airbag including:
  an outer skin, the outer skin having a first opening,
  a controllable ventilation device having a flap at least indirectly attached to the outer skin, the controllable ventilation device further having an additional layer,
  a tether having a first end attached to the flap, and
wherein when the airbag is deployed and the tether is under tension, the flap covers the first opening at least partially such that the ventilation device is in a closed or throttled first state, and wherein when the airbag is deployed and the tether is not under tension, the flap covers the first opening less than in in the first state, such that the ventilation device is in second state, the additional layer having a second opening overlapping the flap, and wherein the additional layer covers the periphery of the flap such that the flap is held between the outer skin and the additional layer when in the first state,
wherein both the flap and the additional layer are triangle-shaped, and
wherein the two triangles are identically orientated.

15. An airbag comprising:
an outer skin, the outer skin having a first opening;
a controllable ventilation device having a flap at least indirectly attached to the outer skin, the controllable ventilation device further having an additional layer, wherein the controllable ventilation device is located at the first opening;
a tether having a first end attached to the flap, and a second end attached to a holding element; and
wherein when the airbag is deployed and the tether is under tension, the flap covers the first opening at least partially such that the ventilation device is in a closed or throttled first state, and wherein when the airbag is deployed and the tether is not under tension, the flap covers the first opening less than in in the first state, such that the ventilation device is in second state, the additional layer having a second opening overlapping the flap, and wherein the flap and the additional layer are formed from a unitary piece of material.

16. The airbag module according to claim 15, wherein the additional layer covers the periphery of the flap such that the flap is held between the outer skin and the additional layer when in the first state.

17. The airbag module according to claim 15, wherein both the flap and the additional layer are triangle-shaped.

* * * * *